United States Patent

Ali-Vehmas et al.

[11] Patent Number: 6,035,189
[45] Date of Patent: Mar. 7, 2000

[54] METHOD FOR USING SERVICES OFFERED BY A TELECOMMUNICATION NETWORK, A TELECOMMUNICATION SYSTEM AND A TERMINAL FOR IT

[75] Inventors: Timo Ali-Vehmas, Salo; Pekka Heinonen, Espoo; Harri Okkonen, Espoo; Lioudmila Blants, Espoo; Petteri Saarinen, Helsinki, all of Finland

[73] Assignee: Nokia Mobile Phone, Ltd., Espoo, Finland

[21] Appl. No.: 08/867,296

[22] Filed: Jun. 2, 1997

[30] Foreign Application Priority Data

Jun. 6, 1996 [FI] Finland ................. 962351

[51] Int. Cl.[7] ................. H04M 3/42; H04M 3/00
[52] U.S. Cl. ................. 455/414; 455/418; 455/419
[58] Field of Search ................. 455/414, 432, 455/434, 457, 456, 552, 553, 556, 557, 550, 575, 421, 558, 566; 379/433

[56] References Cited

U.S. PATENT DOCUMENTS

| | | | |
|---|---|---|---|
| 5,109,403 | 4/1992 | Sutphin | 455/419 |
| 5,297,192 | 3/1994 | Gerszberg | 455/419 |
| 5,418,837 | 5/1995 | Johansson et al. | 455/558 |
| 5,479,476 | 12/1995 | Finke-Anlauff | 379/58 |
| 5,579,535 | 11/1996 | Orlen et al. | 455/421 |
| 5,615,260 | 3/1997 | Kurgan | 379/433 |
| 5,867,781 | 2/1999 | Hofmann | 455/418 |
| 5,867,795 | 2/1999 | Novis et al. | 455/566 |

FOREIGN PATENT DOCUMENTS

| | | |
|---|---|---|
| 0365200 | 4/1990 | European Pat. Off. . |
| 0459344A1 | 12/1991 | European Pat. Off. . |
| 0542049 | 5/1993 | European Pat. Off. . |
| 0562890A1 | 9/1993 | European Pat. Off. . |
| 0679040A2 | 10/1995 | European Pat. Off. . |
| 0679040A3 | 10/1995 | European Pat. Off. . |
| 0772367A2 | 5/1997 | European Pat. Off. . |
| 2289825 | 11/1995 | United Kingdom . |
| WO 95/23483 | 5/1995 | WIPO . |

*Primary Examiner*—Dwayne D. Bost
*Assistant Examiner*—Raymond B. Persino
*Attorney, Agent, or Firm*—Perman & Green, LLP

[57] ABSTRACT

The invention relates to the use of intelligent network services from a terminal (3) of a telecommunication network and particularly to the introduction of new services and a programmable user interface of a terminal. A service provider (5) programs service functions in a switching centre (1) of a telecommunication network and delivers to a user a program which is loaded in the user's terminal (3). According to the loaded program the terminal, advantageously a telephone apparatus equipped with a display (7), shows to the user the available services and the corresponding commands assigned to the function keys (8a) of the terminal. The user gives the required commands which advantageously are one-push-of-a-button long and the meanings of which at each particular situation are shown on the terminal's display. Advantageously the program is delivered to the user by loading it in an intelligent card (6) controlling the operation of the terminal.

13 Claims, 2 Drawing Sheets

METHOD FOR USING SERVICES OFFERED BY A TELECOMMUNICATION NETWORK, A TELECOMMUNICATION SYSTEM AND A TERMINAL FOR IT

BACKGROUND OF THE INVENTION

The invention relates in general to the use of services offered to users of a telecommunication network using the services via individual terminals and particularly to a method for easily bringing the continuously changing and developing services of an intelligent telecommunication network within the reach of private users. The invention also relates to a telecommunication system wherein changing services are offered to users, and a terminal for such a system.

Intelligent network (IN) is a known concept in telecommunication technology and it generally refers to a telecommunication network control method wherein the services offered by a telephone network have been made more versatile than in the ordinary public switched telephone network (PSTN). Basic services of a modern intelligent network include call transfers and alternative billing, for example. It is also possible to include in a PSTN switching centre a service that supports user mobility. It is typical of intelligent networks that the switching centres include some kind of programming facility with which the network operators or somebody authorized by them can alter the operation and services of the network without changing a significant part of the system software of the switching centre. It is presumable that in the future the amount and range of telecommunication services offered will be considerably higher and wider, thereby making those services an important factor in the competition between network operators.

Services provided by intelligent networks can be divided into free services and services liable to charges. Free services are accessible to all subscribers of the network and instructions for their use are published in announcement and information material, such as telephone directories and customer newsletters. Use of services liable to charges normally requires that some kind of an agreement be signed by the user and the service provider. The service provider is not necessarily the same as the company maintaining the network but the service provider has got a programming connection to the switching centre(s) of the intelligent network. When the agreement has been signed, the service provider programs the switching centre to accept the service in question for that particular subscriber ID code.

In modern intelligent networks, the free and non-free services are usually activated and controlled by the user issuing commands from his terminal (phone) which are directed via the network to a command interpreter in the switching centre and therefrom to the unit controlling the operation of the switching centre. The switching centre responds by enabling or disabling a certain service (having checked that the user is authorized to use the service in question, if the service is liable to charges) or by performing some other function required by the user. As the interfaces of most of the phones in PSTN networks comprise only a handset and a dial pad, the commands issued by users are usually series of digits with occasional special characters, like # and *. Presses of buttons are transformed into dual-tone multifrequency (DTMF) signals in the network. Certain networks, such as the integrated services digital network (ISDN), have, in addition to the specific digit and character sequences, special signalling practices that can be used for transferring commands from the users to the switching centre of the intelligent network.

As the number of services increases and the supply becomes more versatile, it is presumable that the currently used commands consisting of character sequences will become impractically long. Even today, users have to memorize several rather long command sequences in conjunction with certain services. Such services include voice mail and the use of bank services by phone, wherein users have several options the commands for which they have to learn by heart or look them up in the operating instructions of the service every time they use the service in question.

One solution to the problem caused by the diversity of services and commands was to include in the phone special function keys so that standard functions associated with those keys could replace some of the digit sequence commands. There is, however, the problem that the services offered may change and develop very rapidly as both the network operators and the service providers compete for market shares and develop their operations. Solutions based on the technical implementation of the telephone quickly become outdated and it is probable that the users are not willing to acquire a new terminal very often.

SUMMARY OF THE INVENTION

An object of this invention is to provide a method for efficiently bringing the continuously changing and developing services of an intelligent telecommunication network within the reach of private users. Another object of the invention is to provide a method for making the use of changing services independent of the technical implementation of the terminal when the terminal meets certain minimum requirements. A further object of the invention is that the method according to the invention is easy to use and does not require unreasonable learning or memorizing efforts of the user. Yet another object of the invention is to provide a method with which the billing of services liable to charges is easy to implement.

The objects of the invention are achieved with a programmable telephone user interface which is updated by conveying the information required for the programming of the terminal from the service provider to the user.

The method according to the invention for using services offered by a telecommunication network which includes at least one switching apparatus and user terminals communicating with it, wherein said switching apparatus can be arranged to offer services via said telecommunication network and said user terminals include output means for displaying information about said services to the user and input means for making selections concerning said services, is characterized in that a certain service is created and said switching apparatus is made to operate according to said service, a set of instructions is drawn up which, when loaded in a terminal, controls said terminal in a manner such that said service can be used via the terminal, displaying on the output means of the terminal information about the service in question and using the input means to make selections concerning the service in question, and said set of instructions is conveyed to the user to be loaded in the terminal.

The invention also relates to a telecommunication system to implement the method described above. The telecommunication system according to the invention is characterized in that it comprises means for conveying sets of instructions concerning new services to the user to be loaded in a user terminal.

The invention also relates to a terminal for the telecommunication system described above. The terminal according to the invention is characterized in that it comprises means for loading sets of instructions concerning new services, means for displaying to the user information about said new services in a manner specified by the sets of instructions and means for making user selections concerning said new services in a manner specified by said sets of instructions.

The invention is based on the idea that the concept of the intelligent network can be extended towards the user and the terminal. Embedded software controlling the operation of the terminal includes an extension interface whereby the user or the service provider can add features to the operation of the terminal, advantageously a telephone, which both indicate to the user the services offered and the actions required to use them and see to that the commands corresponding to the user's selections are sent to a switching centre of the network. The extension can be called a programmable user interface and in the preferred embodiment it comprises menudriven functions so that the user can browse through the range of options on the display of the phone and advantageously advance with one-button commands through various selections to the desired goal. Services and commands are added by sending an extension program or code from the service provider to the user to be loaded in the phone where it produces new menus and/or options and handles the corresponding command traffic between the phone and the switching centre of the network. The extension program can be delivered to the user on a separate storage medium, such as an intelligent card, or it can be transferred as a data message over the telecommunication network.

In the arrangement according to the invention a terminal, advantageously a telephone, serves as a platform which only has to include certain minimum functions related to updating menus and options and to displaying those menus and options to the user and to interpreting user selections as well as to handling the transmission and reception of the command traffic corresponding to those user selections between the phone and the switching centre of the intelligent network. These functions will be described in more detail later. For phones from different manufacturers to be be compatible as regards the services of a certain network the characteristics of the phones have to be standardized at least to some level.

Extension and update information, which is programmed into the phone for a new service, has to be expressed in the form of a computer program or corresponding instructions which can be loaded in the storage media used by the processor controlling the operation of the phone. The programming language or the like, in which the extension and update programs are implemented, is advantageously a set of sentences with a standardized syntax so that in principle anyone can draw up an extension program for a particular service, hire network capacity from a network operator and offer his services to users.

The invention is described in greater detail with reference to the preferred embodiments, presented for the sake of illustration, and to the accompanying drawings, wherein

DETAILED DESCRIPTION OF THE INVENTION

Figure 1:
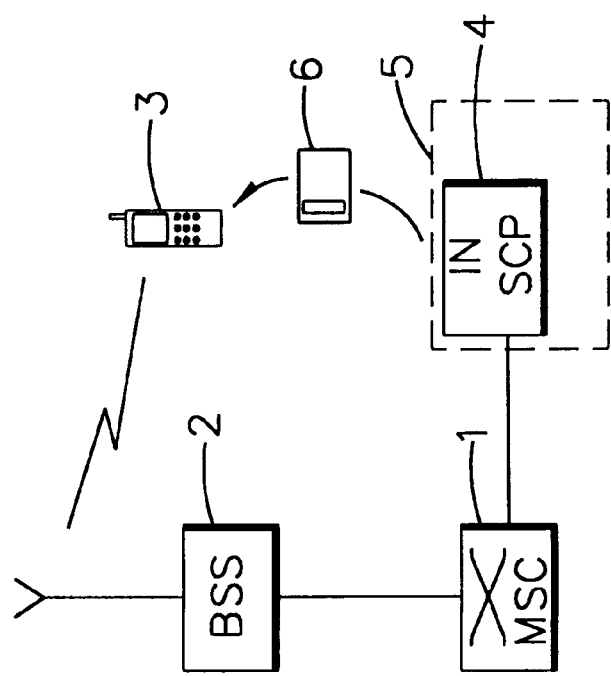
FIG. 1 shows a simple telecommunication network in which the method according to the invention can be applied.

FIG. 1 shows in a schematic manner part of a cellular radio telephone network capable of intelligent network operation, wherein the method according to the invention can be applied. The central unit in the network is a mobile switching centre 1 (MSC) which includes all the data processing, switching and data base properties that are needed for network control and maintenance. Under the mobile switching centre there are several base station subsystems 2 (BSS), of which only one is shown, for reasons of simplicity. The subsystems 2 include base station controllers and base stations (not shown), the latter providing a radio interface for mobile stations 3 (MS) operating in the network. In the network shown, the mobile switching centre 1 has a wire link to a separate intelligent network service control point 4 (IN SCP) which may be located e.g. in the premises of the telecommunications company 5 providing the services, which can be very far away from the mobile switching centre 1.

In the embodiment illustrated by FIG. 1, network services can be used with an intelligent card 6, which is given to a user by a company selling telecommunication services to be connected to a mobile station 3. One such intelligent card is the subscriber identity module (SIM) in the known GSM mobile phone system, which is given to a user when he becomes a subscriber to a network operator. According to the prior art, the SIM card can be used as permanent memory to store data needed for identifying the subscriber and possibly a lot of other data, such as user-programmable short-dial numbers and telephone directory notes, short text messages received by the phone, network selections by the user or data related to billing. According to an embodiment of the invention, the intelligent card 6 is also used for programming and updating the user interface of the mobile station 3. However, the invention as such does not require an intelligent card of the phone or other terminal equipment, if the equipment otherwise has the storage capacity needed.

Figure 2:
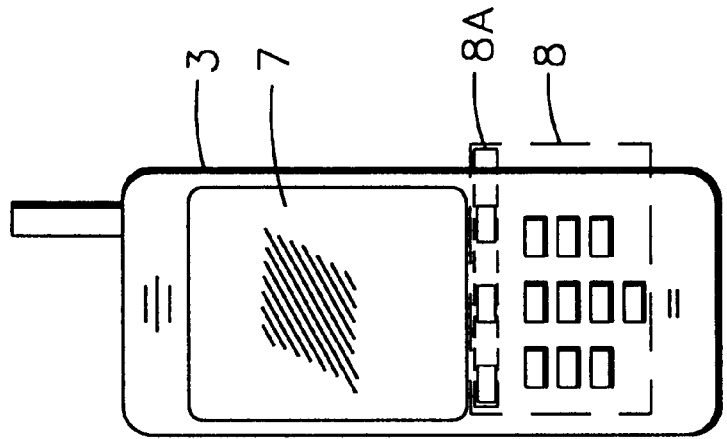
FIG. 2 shows in a schematic way a mobile phone that can be used in the manner according to the method according to the invention.

FIG. 2 shows schematically a mobile phone 3 which is here used as terminal equipment. It is obvious to one skilled in the art that the application of the invention is not limited to mobile phones but the method according to the invention can be applied to all kinds of terminal equipment in a telecommunication network that are used for conveying intelligent network services. The mobile phone in FIG. 2 particularly comprises a display 7 and keypad 8. Within the keypad there are function keys 8a which are located near the display 7. It is intended that the function keys 8a can be used for various purposes in various situations, wherein texts or symbols are displayed on the display 7 beside the function keys to remind the user of the functions of the function keys in that particular situation. The display 7 may also be a touch-sensitive display known to a person skilled in the art, in which case the keypad 8 is not necessarily required but the user can give the commands to the mobile phone by touching the screen at the appropriate locations. Then certain locations of the touch screen, displaying texts or symbols corresponding to the functions, correspond to the function keys 8a. As speech recognition technology improves, it is also possible to achieve a situation wherein the user gives all input to the mobile phone as voice commands instead of key presses.

Figure 3:
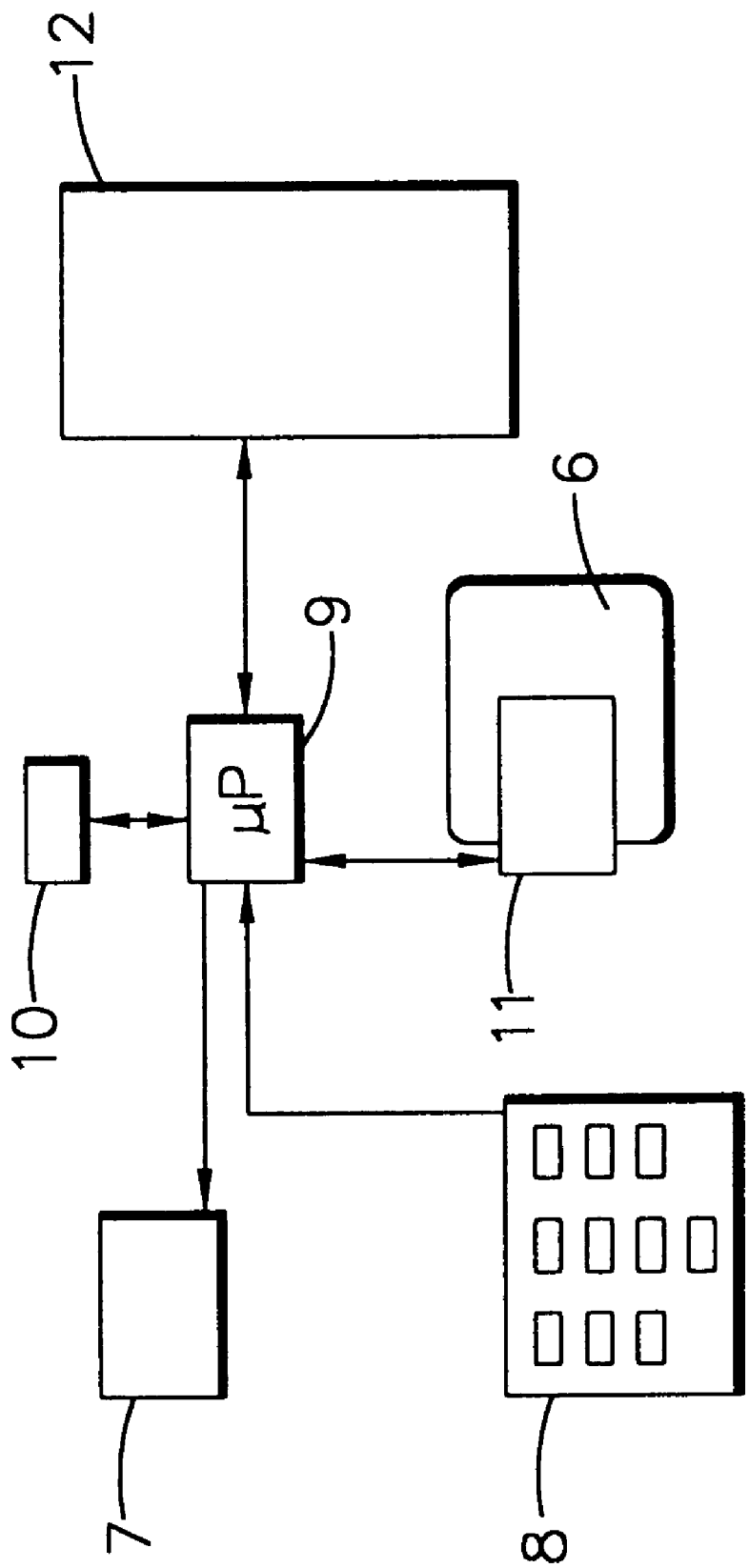
FIG. 3 shows in a schematic way the parts of the mobile phone shown in FIG. 2 on the operation of which the invention has effect. Like elements in the drawings are denoted by like reference designators.

FIG. 3 shows schematically the parts of the mobile phone 3 that in the preferred embodiment participate in implementing the method according to the invention. Operation of the telephone 3 is controlled by a central processing unit 9 which comprises a microprocessor and has storage means 10 at its disposal. The central processing unit 9 is connected to an intelligent card reader 11 which can communicate bidirectionally with an intelligent card 6 connected to it. The central processing unit receives input from the keypad 8 and produces output on the display 7. In addition, the mobile phone includes a telephone part 12 for data transmission and for processing transmitted speech and data, used by the mobile phone to communicate between the nearest base station (not shown). The implementation in the drawing is shown as an example.

The use of the method according to the invention is described referring to the implementations shown in the drawings. Let a telecommunication company 5 develop a new service with the intention that a user can browse on his mobile phone 3 the films that are showing at the movie theatres that week and reserve tickets for a show. To implement the service, the names and phone numbers of all movie theatres in that area together with the films showing that week are programmed in the storage means (not separately shown) of the mobile switching centre 1. This kind of programming as such is known to one skilled in the art and is not included in the scope of the present invention. A user who wishes to gain access to the service brings his intelligent card 6 to be programmed at the company 5, where data that are required to control the mobile phone in the manner described below will be loaded in the intelligent card. When the user inserts the intelligent card back in the mobile phone 3, the new services are available to him.

The mobile phone 3 includes a function wherein a list of all available intelligent network services is shown on the display 7 when the user presses a certain key. In the illustrative embodiment of FIG. 3 this means that the central processing unit 9 receives the keystroke as input and responds by reading from the intelligent card 6, by means of the reader 11, the character sequences representing the services and sends them to the display 7. The user browses through the list by means of arrow keys (not separately shown) included in the mobile phone's keypad 8 and in this case selects the option "Cinema" from the list. As a response to the keystroke indicating the selection the central processing unit 9 sends via the telephone part 12 to a base station and further to a switching centre a request for the films showing that week. The switching centre provides the requested information via the base station and the mobile phone receives it through the telephone part 12 and saves it in the storage means 10.

The display shows beside the function keys 8*a* certain options characteristic to this application, such as "Theatres", "Films", "End". When the user presses the function key corresponding to the text or symbol "Films", the display 7 shows an alphabetical listing of the films showing that week. Similarly, option "Theatres" would display an alphabetical listing of the movie theatres in that area. The user can browse through the lists using the phone's arrow keys. When he selects a film, for instance, the display will show the theatre in which that film is on and a list of the playing times. Using the arrow keys the user can select a playing time he wants. Then the markings beside the function keys may change so that a certain key corresponds to text "Reserve" and another certain key corresponds to text "Call". If the user presses numeric key 2 on the keypad followed by the "Reserve" function key, the central processing unit 9 sends via the telephone part 12 an automatic message to the telephone number of that particular movie theatre, making a reservation by the name corresponding to the intelligent card of the user in question for two tickets for the show selected.

Instead of the automatic reservation the user could select "Call" to make an ordinary voice call to the theatre in question. In the case described above, the procedure ends simply by pressing the "End" function key.

Use of the service described above requires certain functions of the mobile phone 3, such as reading of character sequence data from the intelligent card 6, reading of input from the keypad 8 in the form of keystrokes and sending of output to the display 7 in the form of character sequences. Furthermore, automatic bidirectional signalling is required between the central processing unit 9 of the mobile phone and the mobile phone network. Signalling can take place on the speech or data channel. All aforementioned functions are known from the prior art and they are advantageously implemented by programming the commands corresponding to their execution in the form of a computer program in the storage means 10 of the mobile phone's central processing unit.

Instructions and programming data concerning the use of a new service need not necessarily be delivered from the service provider to the user in such a way that the intelligent card 6 is separately brought in to be programmed. The information can also be conveyed via the same telecommunication network in which the other data are transferred. The GSM system includes a specification for a so-called short message function which can be used for sending data messages. The received data can be stored on the SIM card or in the storage means in the mobile phone. In ISDN networks, the arrangement applicable for transferring data according to the invention is known as D-channel data transmission. In the arrangement involving the programming of the intelligent card the user can pay the service provider in cash when the intelligent card is updated. If the data are transferred via the telecommunication network, the billing can be carried out using the same system that is used for the user's telephone bills.

There may be several intelligent cards that can control the operation of the phone. Let us assume that the debit card as it is known today will be developed into an intelligent debit card and the social security card as it is known today will be developed into an intelligent social security card. Then the user can have different, specialized application programs and user interfaces in the different cards. When the user inserts said intelligent debit card in his phone or other terminal equipment, the user interface of the phone is adapted to especially providing bank services, such as information on currency exchange rates, user's bank accounts and pay services. By inserting the intelligent social security card in the phone the user activates a reservation service whereby he can make an appointment in the nearest health centre the phone number of which is stored in the intelligent card. As the user's personal data are also stored in the card, the user need not type or dictate his name and social security code but they are automatically conveyed to the recipient in the form of a short message, for example. The loading and activation of a certain user interface or other application program can be functionally separated from each other in the terminal equipment. For marketing or service reasons, a service provider may send the loading data to all active terminals in which they are stored in temporary memory. Then the service provider may send to the users a short message, for example, indicating which new service is loaded. If the user accepts the new service, the temporary loading is changed permanent and the service is activated; otherwise it is removed from the memory. The terminal may also automatically decide on the loading and/or activation e.g. on the basis of auxiliaries connected to it. An example of separate loading and activation is a situation wherein the user receives a short message "Wanna bet?" from a local bookmaker. After a positive response the user immediately receives on the display of his phone a betting form loaded previously in the memory which he then fills out and sends to the bookmaker as a short message, for example. Certain user interface loadings and activations, such as gallup polls, may also be disposable and they would be automatically removed from the phone's memory after being used once.

Above it was mentioned that it is advantageous to standardize or otherwise harmonize the programming language or other method used for adding new features in the phone's programmable user interface according to the invention. Standardization brings wide compatibility and even competition between network operators and other service providers. A standardized script language advantageously comprises commands such as the ones below (commands are typed in upper-case letters):

DEFINE APPLICATION="Cinema"
   defines the name of an application shown in the list brought to the display,
DEFINE KEY xx="(any series of DTMF signals)"
   automatically assigns to a certain key (here xx) a series of tone frequency commands which will be sent when that key is pressed,
DISPLAY STRING="Sold out"
   shows on the display a certain character string in a response to a certain situation,
DISPLAY SOFTKEY a="Films"
   assigns to a certain function key (here, key a) a certain text or symbol shown on the display beside the function key in question,
IF KEY xx PUSHED SEND STORED STRING="Cancel reservation"
   in a response to a certain keystroke the mobile phone automatically sends a certain text message.

The commands above are presented for illustrative purposes only and are not intended to restrict the invention. In order for the translation of the program from the script language not to strain the data processing capacity of the mobile phone the program can be translated to a machine-readable form before loading it in the intelligent card. This, however, requires that the machine language program format required by the user's terminal equipment be known.

According to the invention, intelligent network services can be easily and flexibly made available to all users and the users or service providers need not learn new or hard-to-remember function sequences. The invention sets only minor requirements on the system hardware, so it does not require significant hardware changes. The billing related to the services can be handled in a simple and straightforward manner.

What is claimed is:

1. A method for using services offered by a telecommunication network comprising at least one switching apparatus and user terminals communicating with the network, wherein said switching apparatus is operative to offer services via said telecommunication network, and said user terminals include output means for displaying information about said services to a user and input means for making selections concerning said services, wherein the method comprises steps of:
   creating a service and operating said switching apparatus according to said service;
   drawing up a set of executable instructions which, when loaded in one of said terminals, controls said terminal in a manner such that said service can be used via the terminal;
   displaying on the output means of the terminal information about the service and using the input means to make selections concerning the service; and
   conveying said set of executable instructions to the user to be loaded in the terminal.

2. The method of claim 1, wherein said set of instructions is delivered to the user by storing the set of instructions in a separate storage means and delivering said storage means to the user to be loaded in said terminal (3).

3. The method of claim 2, wherein said storage means is an intelligent card.

4. The method of claim 1, wherein said set of instructions is delivered to the user by means of data transmission via said telecommunication network.

5. The method of claim 1, wherein said input means of said terminal includes pushbuttons and said set of instructions includes at least instructions defining an indication of the pushbuttons that have a special meaning in relation to the service, and defining how the terminal is to respond when said pushbuttons are pressed.

6. The method of claim 1, wherein said set of instructions is delivered to the user to be automatically loaded in a terminal.

7. A telecommunication system for offering intelligent network services to users, the system comprising at least one switching apparatus and user terminals communicating with a network, wherein
   said switching apparatus comprises a programming interface for programming of new services;
   said terminals comprise output means for displaying information about said services to users, and input means for making selections concerning said services; and
   said system further comprises means for delivering to the users sets of executable instructions concerning the new services to be loaded in a terminal.

8. A terminal for a telecommunication system, the terminal comprising output means for displaying to a user information about services offered by said telecommunication system and input means for making selections concerning said services, wherein
   said terminal further comprises means for loading sets of executable instructions concerning new services, means for displaying information about said new services to a user in a manner determined by said sets of executable instructions, and means for making user selections concerning said new services in a manner determined by said sets of executable instructions.

9. The terminal of claim 8, further comprising means for loading said sets of instructions from a portable storage means.

10. The terminal of claim 8, wherein said terminal is a telephone apparatus.

11. The terminal of claim 10, wherein said terminal is a mobile phone in a cellular radio network.

12. A method for using services offered by a telecommunication network comprising at least one switching apparatus and user terminals communicating with the switching apparatus, wherein said switching apparatus is operative to offer services via said telecommunication network, and said user terminals include output means for displaying information about said services to a user and input means enabling the user to make selections concerning said services, the method comprising steps of:
   creating a service and directing said switching apparatus to operate according to said service;

conveying a set of executable instructions to the user to be loaded in one of said user terminals; and applying said set of instructions to the user terminal, and controlling said terminal by said executable instructions to operate with said service, displaying on the output means of the terminal information about the service, and using the input means of the terminal to make selections concerning the service.

13. A telecommunication system for offering intelligent network services to users, the system comprising at least one switching apparatus and user terminals communicating with a network, wherein said switching apparatus comprises a programming interface for a programming of new services;

said terminals comprise output means for displaying information about said services to users, and input means for making selections concerning said services;

said system further comprises means for delivering to the users sets of executable instructions concerning new services to be loaded in a terminal; and said terminals are responsive to said executable instructions in accordance with a user selected one of a plurality of services for communicating data via said network.

* * * * *